A. D. SHAW.
TIRE MILEAGE REGISTER.
APPLICATION FILED OCT. 25, 1916.
1,238,205.
Patented Aug. 28, 1917.
2 SHEETS—SHEET 1.
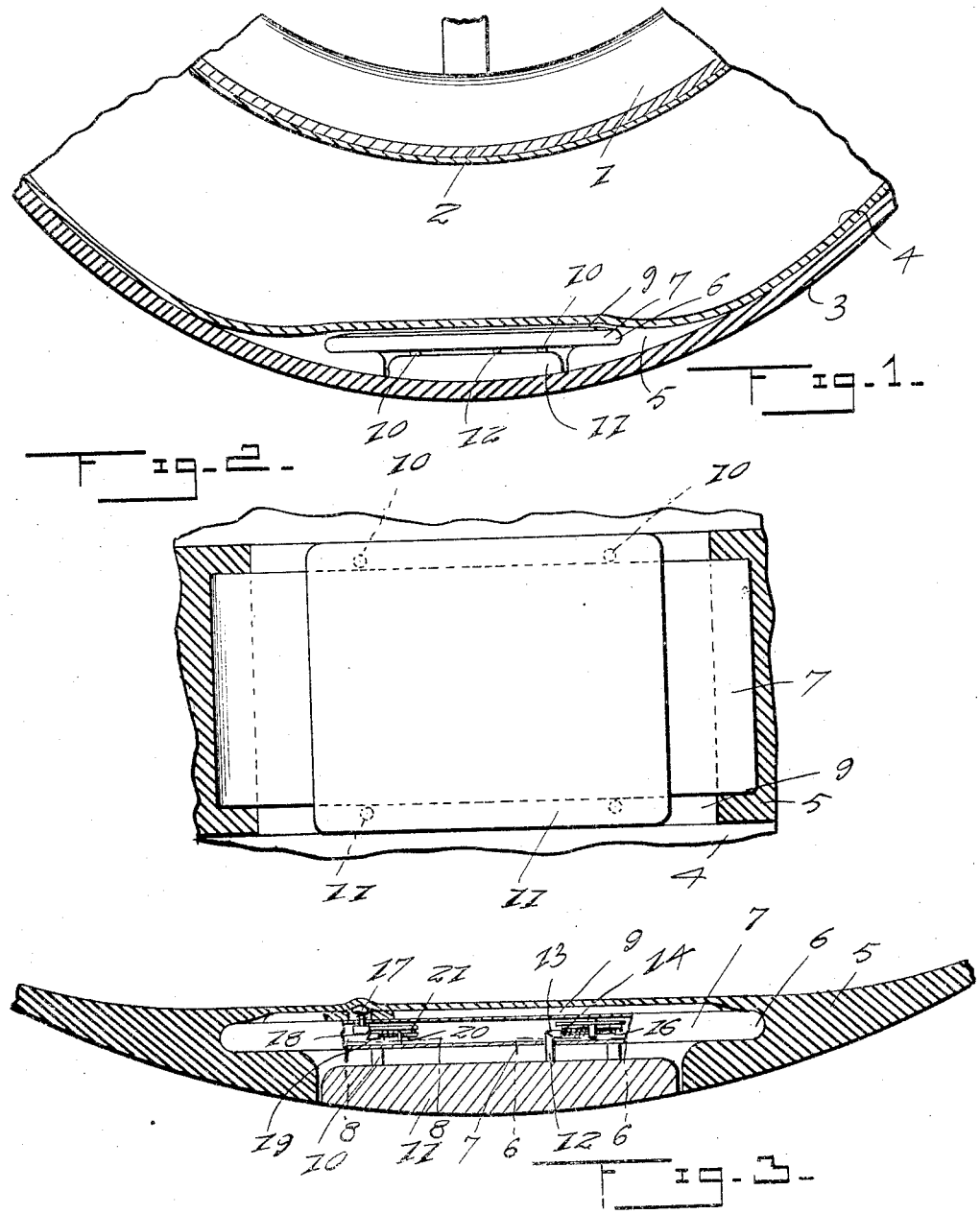
Inventor
A. D. Shaw.
Witness
Attorney

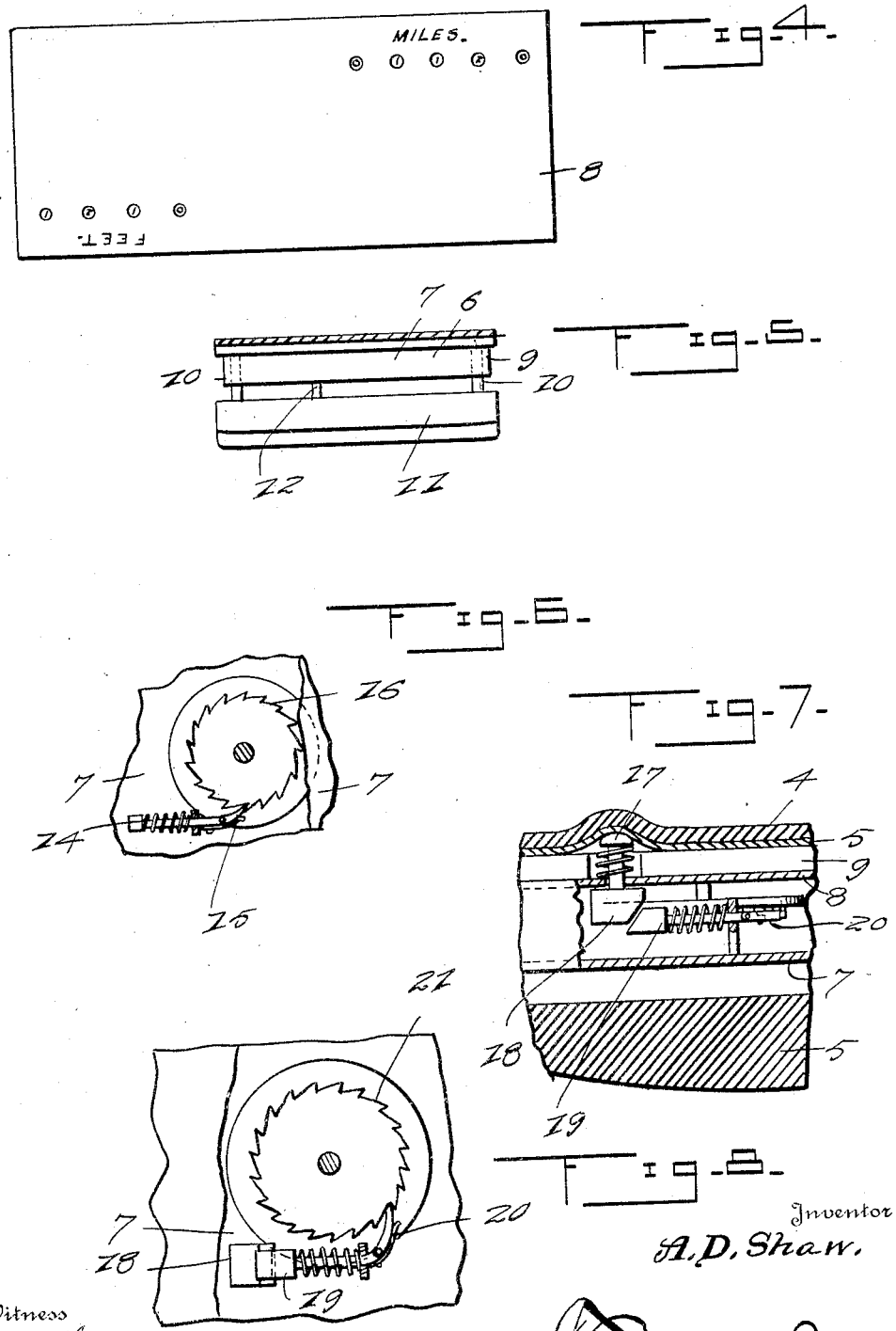

UNITED STATES PATENT OFFICE.

ALLAN D. SHAW, OF SAVANNA, ILLINOIS.

TIRE-MILEAGE REGISTER.

1,238,205.  Specification of Letters Patent.  Patented Aug. 28, 1917.

Application filed October 25, 1916. Serial No. 127,625.

*To all whom it may concern:*

Be it known that I, ALLAN D. SHAW, a citizen of the United States, residing at Savanna, in the county of Carroll and State of Illinois, have invented certain new and useful Improvements in Tire-Mileage Registers; and I do hereby declare the following to be a full, clear, and exact description of the invention, such as will enable others skilled in the art to which it appertains to make and use the same.

This invention relates to a tire mileage register and has for its primary object the provision of means whereby the device may be readily applied to any standard type of tire, so that the mileage of the same may be determined when desired in traction.

Another object of this invention is the provision of means whereby the distance may be determined when the tire is run or used in traction in a deflated or flat condition.

A further object of this invention is to provide a substantially flexible support secured to a tire and having means for registering the mileage of the tire as the same is used in traction on an automobile.

A further object of this invention is to provide operating plates connected by posts and operatively connected with the register located in the support and adapted to operate the register upon each complete revolution of the tire, so that at any time the mileage of the tire may be readily determined.

A still further object of this invention is the provision of a tire mileage register of the above stated character which will be simple, durable and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference will be had to the following description and accompanying drawings, in which:

Figure 1 is a fragmentary sectional view of a tire and inner tube illustrating my invention applied thereto, Fig. 2 is a bottom plan view of the tire mileage register constructed in accordance with my invention, Fig. 3 is a longitudinal sectional view of the same, Fig. 4 is a plan view of a casing located within the flexible support, for containing the register, Fig. 5 is an end elevation of the invention illustrating the means of connecting the inner plate with the outer plate, Fig. 6 is a detail view illustrating the means of operating one of the gears of the mileage register, Fig. 7 is a detail sectional view illustrating the means of operating the register for the distance the tire is run in a deflated condition, and Fig. 8 is a detail sectional view taken on the line 8—8 of Fig. 3.

Referring in detail to the drawings, the numeral 1 indicates the felly of an automobile wheel having the rim 2 secured thereon to which is secured the usual tire or shoe 3 having the inner tube 4. The foregoing description relates to an automobile wheel and tire of a well known type and to which my invention is applied.

A substantially flexible support 5 which is curved to conform with the contour of the inner wall of the tire or shoe 3 and has each end thereof tapered so as not to present a rough or sharp face or surface for the inner tube 4 to engage, is cemented to, made part of, or otherwise secured to the inner wall of the tire or shoe 3 and has an opening 6 therein for receiving a casing 7, in which are mounted adjacent each end thereof registers of any desired construction. The top plate 8 of the casing 7 is provided with a plurality of openings whereby the registers may be read from the exterior of the casing. A plate 9 is positioned over the plate 8 of the casing 7 and has secured thereto a plurality of pins 10 which extend through the casing 7 adjacent the edges thereof and have secured thereto an operating plate 11. The pins 10 are of sufficient length to support the operating plate 11 in spaced relation to the casing 7 by pressure or action of the inner tube on the plate 9 being transmitted by the connecting posts 10 to the operating plate 11, as clearly illustrated in Fig. 3.

A tapering pin 12 is secured to the operating plate 11 and extends through an opening in the casing 7 and has its free end beveled as illustrated at 13 for engaging the beveled end of a spring pressed bolt 14. The bolt 14 is slidably mounted within the casing 7. A spring pressed dog 15 is pivoted to the bolt 14 for engagement with the ratchet wheel 16 of the register, whereby upon movement of the operating plate 11 in the direction of the casing 7 the spring pressed bolt 14 will be caused to be moved and causing the spring pressed dog 15 to turn the ratchet wheel 16 which in turn operates the mileage register.

In operation, the substantially flexible support 5 is cemented to or made part of the inner wall of the shoe or casing 3 having the inner tube 4 resting upon the plate 9 which is connected by posts slidable through the casing 7 to the operating plate 11. As the tire or shoe 3 rotates with the wheel of the automobile in traction, the operating plate 11 due to the weight of car resting on it will move in the direction of the casing 7 when that point of the casing or shoe comes in contact with the ground, causing the pin 12 to operate the mileage register, whereby the mileage of the tire may be readily determined upon removing the shoe or tire 3 from the rim 2 and removing the inner tube so that the opening in the top plate 8 of the casing 7 will be visible and displaying the numbers upon the register.

A spring pressed pin 17 is mounted for slidable movement in the top plate 8 of the casing 7 and extends through an opening in the plate 9. The tension of the spring is sufficient to overcome the pressure of the inner tube 4 preventing the pin 17 from being moved inwardly within the casing 7. The pin 17 has a head 18 formed thereon and located within the casing, one face of which is beveled to engage a spring pressed slidable bolt 19 which has secured to one end thereof a spring pressed dog engaging the ratchet wheel 21 constituting a portion of the other register located within the casing 7 for registering the number of feet the shoe 3 is run in a deflated or flat condition upon the automobile wheel.

When the tire or shoe 3 becomes flat owing to the deflation of the inner tube 4, the last mentioned register will be caused to operate by the pin 17 coming in contact with the rim or heel portion of the tire or shoe 3 at that point of the tire or shoe 3 coming in contact with the ground. The weight of the automobile overcomes the pressure of the spring upon the pin 17 causing the pin 17 to move inwardly and operate the bolt 19. The bolt 19 is caused to slide owing to the beveled face thereof and the beveled face upon the head 18 of the pin 17, causing the dog 20 to rotate the gear 21 which in turn operates the register thus registering the number of feet that the tire is run upon the wheel in a flat or deflated condition.

The registers heretofore mentioned are located within each end of the casing 7 and are of any ordinary construction, operated by the ratchet wheels 16 and 21, which constitutes a portion of the registers.

From the foregoing description taken in connection with the accompanying drawings, it will be noted that a device is provided which may be readily placed within any shoe or tire of a standard type between the inner tube and inside wall of a tire or shoe, or a support carried by or made part of the wall of a shoe or casing and which will efficiently operate under all conditions due to the weight of the car causing action of the registering mechanism to register the mileage of the tire when inflated and the number of feet which the tire has been run in a deflated or flat condition.

While I have shown and described the preferred embodiment of my invention, it will be understood that minor changes in construction, combination and arrangement of parts may be made without departing from the spirit and scope of the invention as defined in the claims.

What is claimed is:

1. The combination with a tire including an inner tube, of a flexible support secured to the inner wall of the tire, said support having a recess therein, a casing located within said recess, a registering mechanism located in said casing, a plate carried by said support and resting upon the casing, pins secured to said plate and extending through the casing, bearing plates curved to conform to the contour of the inner wall of the casing and secured to said pins and spaced from the casing and means for operatively connecting the operating plate with the registering mechanism to operate the mechanism upon rotation of the tire.

2. The combination with a tire including an inner tube, of a support secured to the inner wall of the tire and having a recess therein, a casing located within said recess, a registering mechanism located in said casing, a plate carried by said support and resting upon the casing, pins carried by said plate and extending through the casing, an operating plate secured to the pins, a pin secured to the operating plate and extending into the casing, a spring pressed bolt operatively connected with the registering mechanism and adapted to be engaged by the pin upon an operating impulse to the operating plate on each rotation of the tire.

3. The combination with a tire including an inner tube, of a support secured to the inner wall of the tire and having a recess therein, a casing located within said recess, a registering mechanism located within said casing, a pin slidable in said casing and bearing against the inner tube, a spring mounted on the pin to prevent the movement of the pin into the casing by the pressure of the inner tube thereon, and a spring pressed bolt operatively connected to the registering mechanism operated by the pin engaging the tire when deflated upon each revolution of the tire.

4. A distance register for automobile tires comprising a registering mechanism carried by the tire, a plate arranged on one side of said mechanism for movement with relation thereto, a second plate arranged on the other side of said mechanism for movement with relation thereto, means connecting said plates, and a connection between said mechanism and one of said plates.

5. A distance register for automobile tires comprising a registering mechanism carried by the tire, a plate arranged on one side of said mechanism for movement with relation thereto, a second plate arranged on the other side of said mechanism for movement with relation thereto, pins connecting said plates to cause them to move in unison when forced to move either by the air pressure of the tire or by the tire in traction coming in engagement with the highway at a point of the plate, and a connection between said mechanism and one of said plates.

6. A distance register for tires comprising a registering mechanism located within the tire and secured in spaced relation to the tread surface of the tire, and a movable member operatively connected to said mechanism, and located between it and the tread surface of the tire.

7. A distance register for tires comprising a registering mechanism located within the tire, a movable member located on one side of the mechanism, and a movable member located on the other side of the mechanism and operatively connected with the first mentioned movable member, said second movable member being connected to the registering mechanism to render an operating impulse thereto upon each rotation of the tire.

In testimony whereof I affix my signature in presence of two witnesses.

ALLAN D. SHAW.

Witnesses:
LESLIE H. GRIDLEY,
GRACE M. WITHHART.

Copies of this patent may be obtained for five cents each, by addressing the "Commissioner of Patents, Washington, D. C."